United States Patent

Hikita et al.

[11] Patent Number: 5,812,893
[45] Date of Patent: Sep. 22, 1998

[54] RANGE FINDER

[75] Inventors: Yuka Hikita, Machida; Osamu Nonaka, Sagamihara, both of Japan

[73] Assignee: Olympus Optical Co., Ltd., Tokyo, Japan

[21] Appl. No.: 738,338

[22] Filed: Oct. 25, 1996

[30] Foreign Application Priority Data

Oct. 31, 1995 [JP] Japan ................................ 7-283442

[51] Int. Cl.⁶ .............................. G03B 13/36; G01C 3/08
[52] U.S. Cl. ........................................ 396/106; 356/3.04
[58] Field of Search .................................. 396/106, 542; 356/3.02, 3.03, 3.04–3.08

[56] References Cited

U.S. PATENT DOCUMENTS 4,313,654  2/1982  Matsui et al. .......................... 396/106
5,488,468  1/1996  Kawanishi et al. ................. 356/3.02 X

FOREIGN PATENT DOCUMENTS 2-13217    1/1990  Japan .
3-1378627  6/1991  Japan .

Primary Examiner—W. B. Perkey
Attorney, Agent, or Firm—Louis Weinstein

[57] ABSTRACT

A range finder in accordance with the present invention is a range finder having a light-emitting device and light-receiving device and a printed-circuit board on which electrical parts are mounted. The light-emitting device is mounted on a front face of the printed-circuit board, and the light-receiving device is mounted on the back face thereof. The mounted sides of the light-emitting device and light-receiving device are substantially opposed to each other with the printed-circuit board between them. The printed-circuit board is formed with an opaque member and intercepts harmful light, preventing it from falling directly on the light-receiving device from the light-emitting device.

24 Claims, 10 Drawing Sheets

RANGE FINDER

BACKGROUND OF THE INVENTION

1. Field of the Invention

The present invention relates to a range finder, and more particularly, to a range finder having a light-emitting device and light-receiving device.

2. Description of the Related Art

For automatic focus units (hereinafter AF units) employed in various types of photographing apparatuses such as a camera for producing photographs (still images) and a video camera for producing motion pictures, a so-called active type range finder that emits, for example, infrared light to an object, receives reflected light, and thus determines the distance to the object has generally been used in practice in the past.

Figure 19:
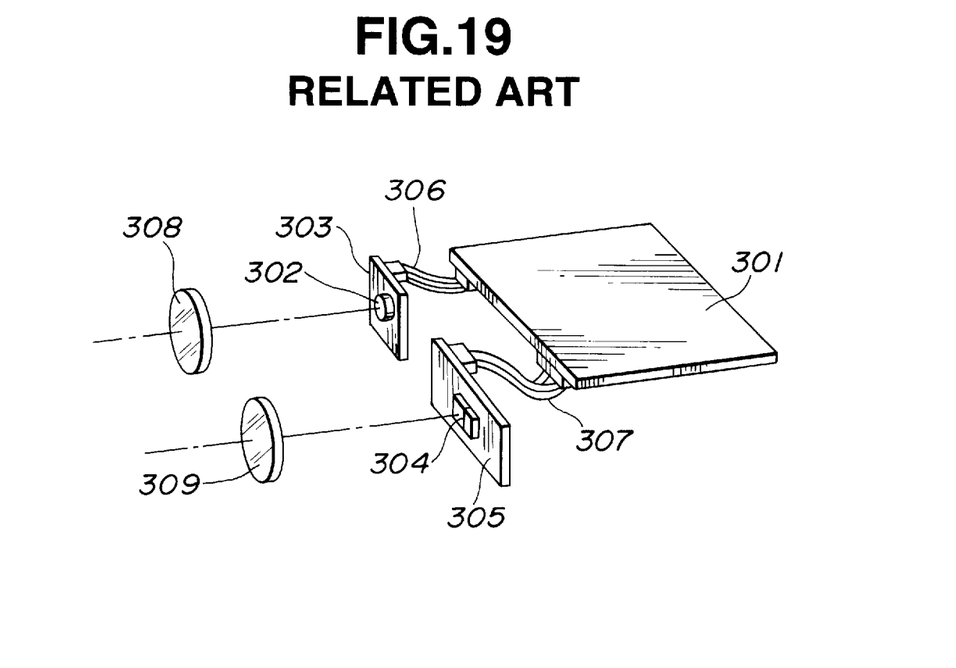
FIG. 19 is a schematic oblique view showing an example of a known active-type range finder.

For example, FIG. 19 shows an example of the foregoing active type range finder. As shown in FIG. 19, a sub printed-circuit board 303 on which a light-emitting device 302 is mounted and a sub printed-circuit board 305 on which a light-receiving device 304 is mounted are linked to a main printed-circuit board 301 by lead wires 306 and lead wires 307 respectively, whereby a range-finding circuit is constructed.

The sub printed-circuit boards 303 and 305 are arranged to be orthogonal to the main printed-circuit board 301 and the optical axes of a light projection lens 308 and light reception lens 309 located in front of the light-emitting device 302 and light-receiving device 304 respectively.

In an AF unit that has generally been used in practice in the past, for example, an AF unit employed in a photographing apparatus such as a camera or video camera, the main printed-circuit board 301 is placed to be parallel to a photographic optical axis because it is required in order to design the photographing apparatus itself compactly. By contrast, the sub printed-circuit boards 303 and 305 on which the light-emitting device 302 and light-receiving device 304 are mounted are formed as members separate from the main printed-circuit board 301 so that a range-finding operation based on trigonometric leveling can be carried out, and arranged to be orthogonal to the optical axes of the light projection lens 308 and light reception lens 309.

In recent years, the trend of a camera for producing photographs has been compact for better portability. Accordingly, range finders to be adapted to compact cameras are demanded to be compact.

For realizing a compact design for a range finder itself, what is conceivable is, for example, to decrease the spacing between a light projection lens (light-emitting device) and light reception lens (light-receiving device).

As for an art for realizing a compact design for a finder, various proposals have been made in, for example, Japanese Unexamined Patent Publication No. 3-138627 and Japanese Unexamined Utility Model Publication No. 2-13217.

In an AF unit disclosed in the Japanese Unexamined Patent Publication No. 3-138627, a light-emitting device (IRED or the like) and light-receiving device (PSD or the like) are mounted on the same printed-circuit board, and light is led to a light projection lens and light reception lens via a reflecting mirror or the like.

As for an electronic equipment disclosed in the Japanese Unexamined Utility Model Publication No. 2-13217, a printed-circuit board on which a light-receiving device is to be mounted is characterized optically and thus provided with the capability of an optical filter. Consequently, a simple and compact design has been realized.

However, when the spacing between a light projection lens and light reception lens in a range finder is shortened in order to realize a compact design for a camera, since the spacing between a light-emitting device and light-receiving device is also shortened, there is a problem of a harmful light component that falls directly on the light-receiving device from the light-emitting device, and that is produced separately from light, which is projected from the light-emitting device, reflected from an object, and then falls on the light-receiving device, that is, signal light needed for range finding. This becomes a cause of deteriorating accuracy in range finding.

According to the means disclosed in the Japanese Unexamined Patent Publication No. 3-138627, it is required as a countermeasure against, for example, the problem of a harmful light component to intercept light between a light-emitting device and light-receiving device. However, the countermeasure has not been described. The problem of a harmful light component has therefore not been solved.

According to the means disclosed in the Japanese Unexamined Utility Model Publication No. 2-13217, a transparent printed-circuit board is adopted and used also as an optical filter. This poses a problem that a magnitude of light decay increases.

OBJECTS AND SUMMARY OF THE INVENTION

A major object of the present invention is to provide a range finder capable of solving a problem that, when the spacing between a light projection lens and light reception lens in a range finder is shortened, harmful light other than range-finding signal light falls on a light-receiving device, preventing deterioration of range-finding accuracy, and ensuring high range-finding accuracy.

Another object of the present invention is to provide a range finder capable of realizing a compact design for a range finder and attaining minimal manufacturing cost without any deterioration in range-finding accuracy despite the shortened spacing between a light projection lens and light reception lens.

To put it briefly, according to the present invention, a range finder having a light-emitting device and light-receiving device is characterized in that the range finder further comprises a printed-circuit board on which electrical parts are mounted, the light-emitting device is mounted on the face of the printed-circuit board, and the light-receiving device is mounted on the back thereof.

Moreover, a range finder having a light-emitting device and light-receiving device is characterized in that: the range finder further comprises a flexible printed-circuit board on which electrical parts including the devices are mounted, and a reinforcement member for reinforcing and supporting the flexible printed-circuit board, and intercepting light emanating from the light-emitting device; the flexible printed-circuit board is bent along the reinforcement member; and the light-emitting device and light-receiving device are opposed to each other with the reinforcement member between them.

Moreover, the range finder is characterized in that the reinforcement member is a conductive member and serves also as a shield for a signal line of the light-receiving device.

The above and other objects and advantages of the present invention will be further apparent from the detailed description below.

According to the present invention, there is provided a range finder in which a light-emitting device is mounted on the face of a printed-circuit board, a light-receiving device is mounted on the back thereof, and thus a harmful light component that falls directly on the light-receiving device from the light-emitting device is intercepted. Consequently, high range-finding accuracy can be ensured, and the spacing between a light projection lens and light reception lens can be shortened. Eventually, a compact design can be realized for the range finder itself and minimal manufacturing cost can be attained.

DESCRIPTION OF THE PREFERRED EMBODIMENTS

Figure 1:
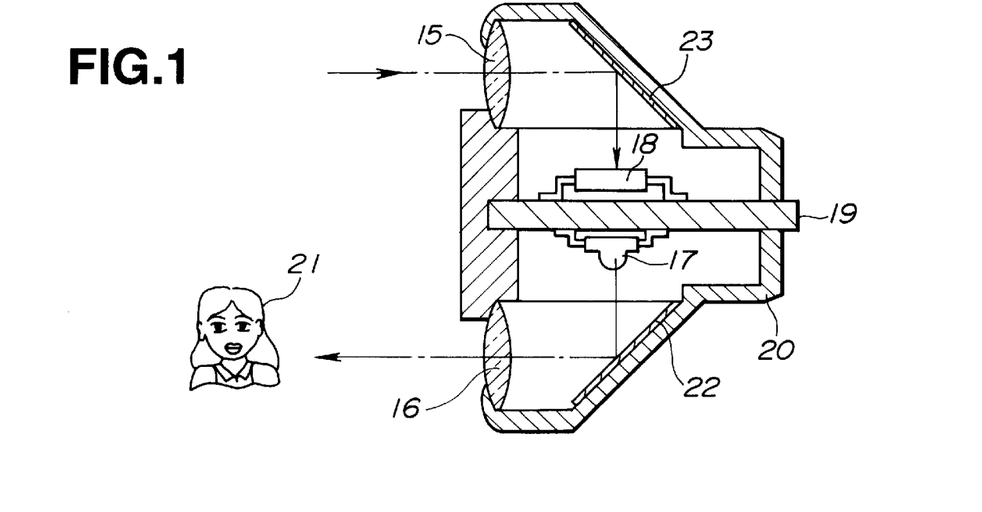
FIG. 1 is a schematic view showing the structure of a range finder of a first embodiment of the present invention.

As shown in FIG. 1, a range finder of the first embodiment of the present invention is constructed by arranging in a main unit 20 a light-emitting device 17 formed with, for example, an infrared light-emitting diode (IRED), a light-receiving device 18 formed with a light position detecting device (PSD) having the ability to detect a light signal, a printed-circuit board 19 on which electrical parts and the like are mounted, a first reflecting mirror 22 that is a first reflector for reflecting a range-finding beam emanating from the light-emitting device 17 and thus changing the optical path, a light projection lens 16 for converging a beam emanating from the light-emitting device 17 and projecting light on an object 21, a light reception lens 15 for receiving reflected signal light reflected from the object 21, and a second reflecting mirror 23 that is a second reflector for reflecting a beam converged by the light reception lens 15 and thus changing the optical path.

The light-emitting device 17 and light-receiving device 18 are mounted on the front face and back face of the printed-circuit board 19.

The printed-circuit board 19 is formed with an opaque member and placed parallel to the optical axes of the light projection lens 16 and light reception lens 15 and between these lenses. The printed-circuit board 19 intercepts light between the light-emitting device 17 and light-receiving device 18, whereby a harmful light component or part of a range-finding beam emanating from the light-emitting device 17 which falls directly on the light-receiving device 18 is eliminated.

The light-receiving device 18 is formed with, as mentioned above, for example, a light position detecting device (PSD) having the ability to detect a light signal, and outputs an electric signal according to an incident position of signal light. Based on the position signal, the distance to the object is measured according to the principles of trigonometrical leveling.

In the range finder of the first embodiment of the present invention having the foregoing components, range-finding light emanating from the light-emitting device 17 is, as indicated with an arrow in FIG. 1, first reflected by the first reflecting mirror 22, has the optical path thereof thus changed by 90°, and is then converged by the light projection lens 16 located on the front side of the range finder.

A beam converged by the light projection lens 16 is projected toward the object 21. The beam reflected from the object 21 is converged by the light reception lens 15, is led to the inside of the range finder, has the optical path thereof changed by 90° by the second reflecting mirror 23, and then falls on the light-receiving device 18.

In this case, for ensuring proper range-finding accuracy, the light-receiving device 18 must receive only the reflected signal light reflected and returned from the object 21. However, if, for example, direct light projected from the light-emitting device 17 falls on the light-receiving device 18, a correct result of range finding cannot be obtained.

In the range finder of the first embodiment, as mentioned above, an opaque member is adapted to the printed-circuit board 19 in order to intercept light between the light-emitting device 17 and light-receiving device 18. Thus, a harmful light component falling directly on the light-receiving element 18 from the light-emitting device 17 is eliminated.

As described above, according to the first embodiment, since the light-emitting device 17 and light-receiving device 18 are placed on the front face and back face of one printed-circuit board 19, the spacing between the light projection lens 16 and light reception lens 15 can be shortened and the number of component members of a range finder can be reduced. Thus, space saving can be achieved for a range finder itself, a compact design can be realized for the range finder, and minimal manufacturing cost can be attained.

Moreover, since the printed-circuit board 19 is formed of an opaque member, light is intercepted between the light-emitting device 17 and light-receiving device 18 mounted on the face and back of the printed-circuit board 19. A harmful light component or part of a range-finding beam emanating from the light-emitting device 17 which falls directly on the light-receiving element 18 can be eliminated. Although the spacing between the light projection lens 16 and light reception lens 15 is shortened, high range-finding accuracy can be ensured.

Figure 2:
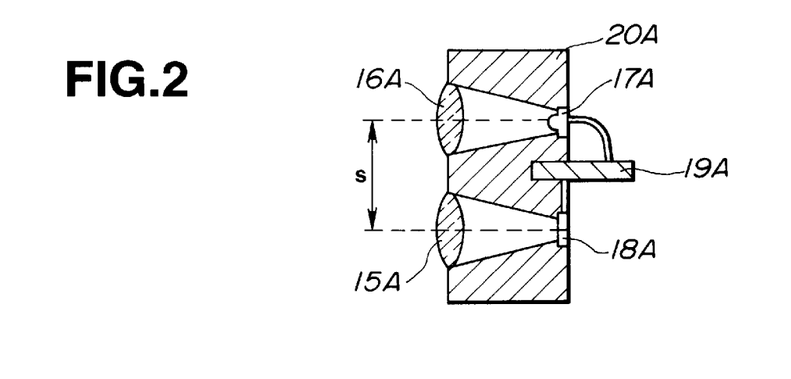
FIG. 2 is a schematic view showing the structure of a range finder of a second embodiment of the present invention.

Next, a range finder of the second embodiment of the present invention will be described below. In the second embodiment, the first and second reflecting mirrors 22 and 23 employed in the first embodiment are eliminated. A range-finding beam emanating from a light-emitting device is projected directly on an object 21, and reflected signal light is received directly by a light-receiving device via a light reception lens.

As shown in FIG. 2, the range finder of the second embodiment is constructed by arranging in a main unit 20A a light-emitting device 17A and light-receiving device 18A, a light projection lens 16A and light reception lens 15A, and a printed-circuit board 19A.

The light-emitting device 17 and light-receiving device 18A are mounted on the front face and back face of the printed-circuit board 19A. In the second embodiment, unlike the light-emitting device and light-receiving device in the first embodiment which are surface-mounted, the light-emitting device 17A and light-receiving device 18A are mounted on the printed-circuit board 19A by soldering or formed with so-called piercing parts.

The light-emitting device 17A and light-receiving device 18A are located behind the light projection lens 16A and light reception lens 15A that are juxtaposed on the front side of the main unit 20A of the range finder, so that the light projection side and light reception side of the light-emitting device 17A and light-receiving device 18A are orthogonal to the optical axes of the light projection lens 16A and light reception lens 15A. A range-finding beam emanating from the light-emitting device 17A falls directly on the light projection lens 16A. Moreover, reflected signal light reflected from the object and converged by the light reception lens 15A falls directly on the light-receiving device 18A.

Even in the second embodiment, since an opaque member is adapted to the printed-circuit board 19A, light is intercepted between the light-emitting device 17A and light-receiving device 18A. A harmful light component falling directly on the light-receiving device 18A from the light-emitting device 17A is thus eliminated.

As mentioned above, since the light-emitting device 17A and light-receiving device 18A are formed with piercing parts, holes (not shown) used to position the parts must be bored on the printed-circuit board 19A. After the light-emitting device 17A and light-receiving device 18A are mounted on the printed-circuit board 19A, the holes are blocked by solder or the like. Incidence of direct light through the holes can be prevented. No problem occurs.

Incidentally, a driver including a transistor and the like for driving the light-emitting device 17A, an IC for processing an output of the light-receiving device 18A, and the like may be mounted on the printed-circuit board 19A.

Figure 3:
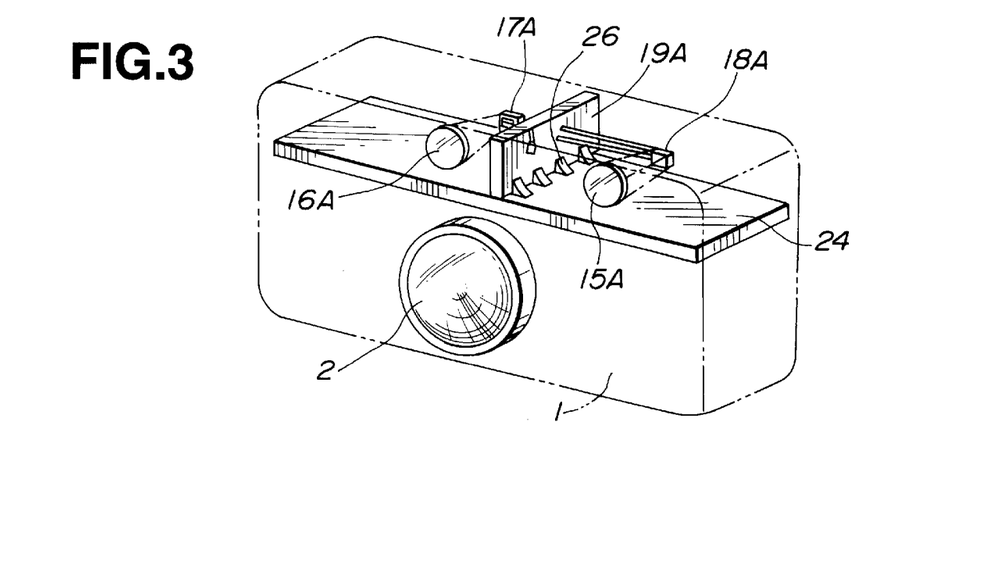
FIG. 3 is a perspective view showing an example of a camera in which the range finder shown in FIG. 2 is incorporated.

FIG. 3 is a perspective view roughly showing an example of a camera in which the range finder of the second embodiment is incorporated. In FIG. 3, for avoiding crowding the drawing, the camera body is indicated with an alternate long and two short dashes line and the component members of the camera that need not be shown are omitted.

As shown in FIG. 3, the printed-circuit board 19A in the range finder is placed on a printed-circuit board 24, on which circuits for driving the camera and the like are mounted, in the upper area inside a camera body 1 so that the printed-circuit boards are orthogonal to each other.

Figure 4:
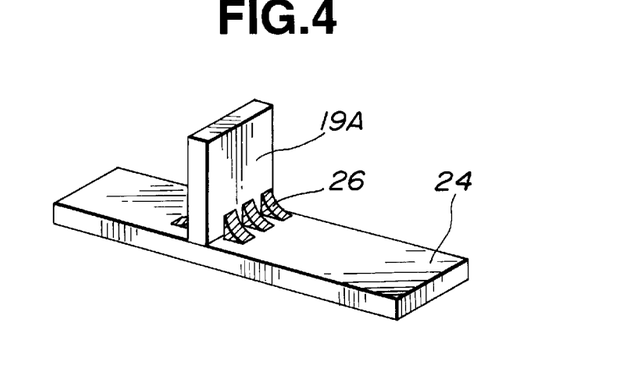
FIG. 4 is an oblique view showing part of FIG. 3 and an example of joining printed-circuit boards.

In other words, as shown in FIG. 4, the printed-circuit board 19A in the range finder and the printed-circuit board 24 in the camera body are placed orthogonally to each other. These printed-circuit boards are fixed by applying a coupling means 26, for example, solder to a contact area between the printed-circuit boards. Moreover, the printed-circuit boards in the range finder and camera body are electrically connected to each other so that they can communicate with each other.

In FIG. 3, reference numeral 2 denotes a photographic lens.

Figure 5:
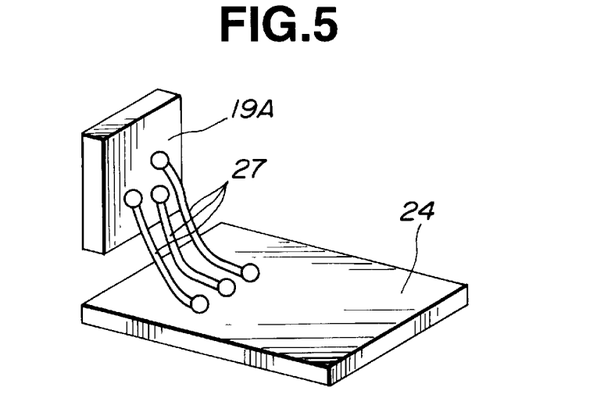
FIG. 5 is an oblique view showing part of FIG. 3 and another example of joining printed-circuit boards.

For connecting the printed-circuit boards in the range finder and camera body, as shown in FIG. 5, the printed-circuit board 19A in the range finder may be placed in the camera body 1 using a fixing member (not shown) so that the printed-circuit board 19 will not come into contact with the printed-circuit board 24 but is orthogonal to the printed-circuit board 24. In this case, the printed-circuit boards 19 and 24 are electrically connected to each other by way of, for example, lead wires 27.

Figure 6:
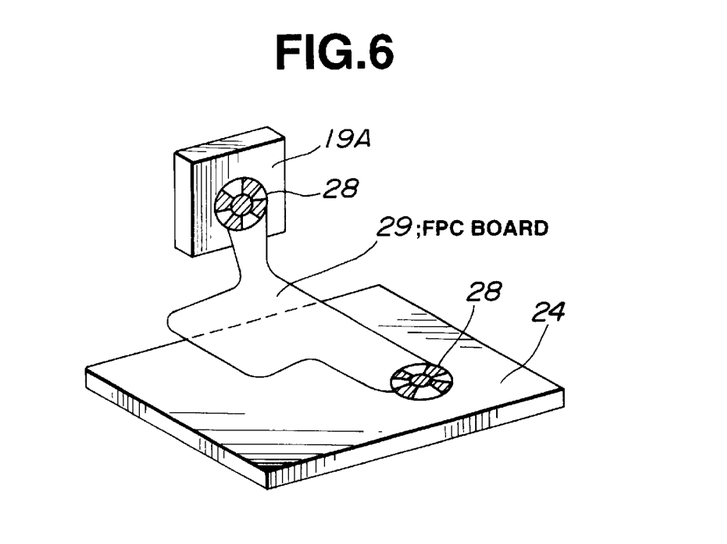
FIG. 6 is an oblique view showing part of FIG. 3 and yet another example of joining printed-circuit boards.

Furthermore, for connecting the printed-circuit boards in the range finder and camera body, as shown in FIG. 6, a connector part 28 in which a conductor such as copper foil is bared may be formed on each of the printed-circuit board 19A in the range finder and the printed-circuit board 24 in the camera body. In this case, the printed-circuit boards are connected to each other through a flexible printed-circuit board (abbreviated as a FPC board) 29 or the like, As for the printed-circuit board 24, either a typical rigid printed-circuit board or a flexible printed-circuit board made of a flexible material that can be bent freely may be adopted.

As described above, even the second embodiment can provide the same advantage as the first embodiment.

Next, a range finder of the third embodiment of the present invention will be described below. In the third embodiment, a flexible printed-circuit board is used as a printed-circuit board on which a light-emitting device and light-receiving device are mounted, and the same components as those in the first embodiment are employed.

Figure 7:
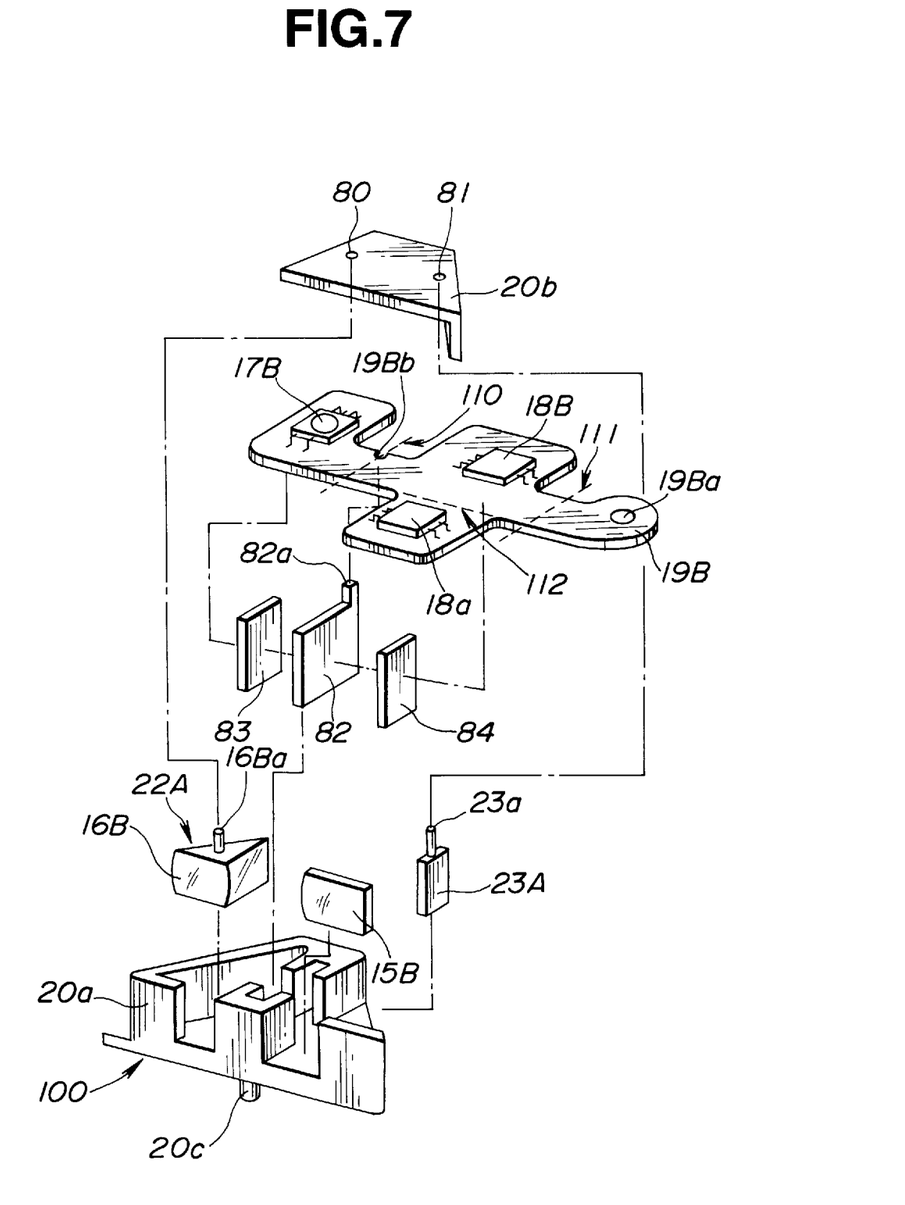
FIG. 7 is an exploded oblique view schematically showing the structure of a range finder of a third embodiment of the present invention.

Specifically, as shown in FIG. 7, the range finder of the third embodiment is such that component members are arranged in a housing (unit) formed with a main unit 20a and a cover member 20b. A flexible printed-circuit board 19B is bent and put in the main unit 20a.

Mounted on the flexible printed-circuit board 19B are a light-emitting device 17B and light-receiving device 18B, an analog integrated circuit (IC) 18a for processing an output signal of the light-receiving device 18B, and the like. Moreover, the flexible printed-circuit board 19B is provided with a connector part 19Ba for electrically connecting the flexible printed-circuit board 19B to the printed-circuit board in a camera body (not shown in FIG. 7 but comparable to the printed-circuit board 24 shown in FIG. 3) to which the range finder is adapted.

The flexible printed-circuit board 19B is bent along lines 110, 111, and 112 indicated with dashed lines in FIG. 7. In this case, the light-emitting device 17B is opposed to the light-receiving device 18B. A shielding plate 82 having a light interception ability and serving also as a reinforcement member for the flexible printed-circuit board 19B is interposed between the light-emitting device 17B and light-receiving device 18B. Herein, the shielding plate 82 is affixed to the flexible printed-circuit board 19B by means of double-sided adhesive tapes 83 and 84, and thus serves also as a reinforcement member for the flexible printed-circuit board 19B. A projection 82a is formed on the shielding plate 82 so that the projection juts upward. A ground pattern 19Bb on the printed-circuit board 19B is soldered to the projection 82a.

A light projection lens 16B for converging a range-finding beam emanating from the light-emitting device 17B and projecting the beam toward an object is placed on one edge in the main unit 20a so that the light projection lens 16B is aligned with the front side of the range finder. The light projection lens 16B is formed with a prism or the like. A first reflecting mirror part 22A of the light projection lens 16B changes the optical path of a range-finding beam emanating from the light-emitting device 17B by 90°.

It may be necessary to adjust the position of the light projection lens 16B so that a range-finding beam can be projected correctly in a given direction. For the position adjustment, an adjustment level part 16Ba is formed on the top of the light projection lens 16B.

Moreover, a light reception lens 15B for converging a beam of signal light emitted from the light-emitting device 17B and reflected from an object is placed on the other edge in the main unit 20a so that the light reception lens 15B is aligned with the front side of the range finder. The beam of reflected signal light converged by the light reception lens 15B has the optical path thereof changed by 90° by a second reflecting mirror 23A located behind the light reception lens 15B, and then falls on the light reception device 18B.

For carrying out position adjustment so that a beam of reflected signal light converged by the light reception lens 15B falls correctly on the light-receiving device 18B, an adjustment lever part 23a is implanted in the top of the second reflecting mirror 23A.

As mentioned above, the main unit 20a in which the component members are arranged and stowed has the top thereof covered by the cover member 20b, whereby a range finder unit 100 (See FIG. 8) is constructed. In this case, the adjustment lever parts 16Ba and 23a jut out through holes 80 and 81 bored on the cover member 20b, and the connector part 19Ba of the printed-circuit board 19B is extended from the lower part of the range finder.

For making it possible to adjust the mounting position of the range finder unit 100, a projection 20c is formed on the bottom of the range finder unit in order to support the range finder unit 100 so that the range finder unit 100 can be turned freely in a camera to which the range finder is adapted.

Adapting the range finder of the third embodiment having the foregoing components to a camera will be described below.

Figure 8:
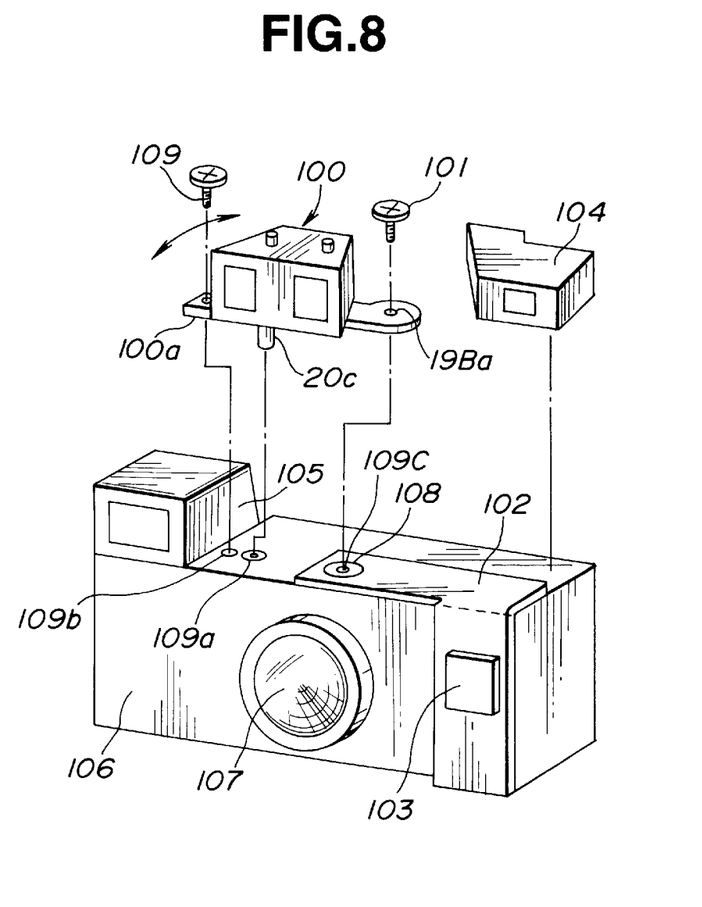
FIG. 8 is an exploded oblique view showing an example of a camera in which the range finder shown in FIG. 7 is incorporated.

The range finder unit 100 having the components described in conjunction with FIG. 7 is, as shown in FIG. 8, locked in the upper part of a camera body 106. A photographic optical system 107 is located on the front side of the camera body 106. A viewfinder unit 104 is located on one edge of the top of the camera body, and a strobe unit 105 is mounted on the other edge of the top thereof.

On the top of the camera body 106, the range finder unit 100 is interposed between the viewfinder unit 104 and strobe unit 105.

On the top of the camera body 106, a hole 109a and screw holes 109b and 109c are bored in an area in which the range finder unit 100 is placed. For mounting the range finder unit 100 on the camera body 106, first, the projection 20c on the bottom of the range finder unit 100 is fitted into the hole 109a on the camera body 106. Thereby, the range finder unit 100 is supported so that the range finder unit 100 can be turned freely on the top of the camera body 106.

In this state, the position of the range finder unit 100 is adjusted. Specifically, as seen from FIG. 9 that shows an example of a picture displayed in a viewfinder picture frame 130 within the viewfinder unit 104 when the camera is directed toward the object 21, the picture frame 130 is usually provided for a viewfinder picture, and an image of an object viewed within this range is to be produced as a photograph. A range-finding target mark 131 is drawn in the center of the picture frame 130. The camera is focused on the object 21 within the range defined by the mark 131.

Figure 9:
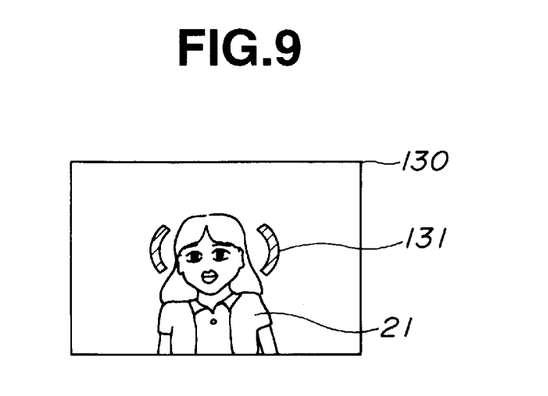
FIG. 9 shows an example of a picture displayed in a viewfinder picture frame of the camera, which is shown in FIG. 8, directed toward an object.

Position adjustment to be carried out is intended to project a range-finding beam emanating from the light-emitting device 17B in the range finder unit 100 precisely on the area within the target mark 131.

After the position of the range finder unit 100 is adjusted, the range finder unit 100 is fixed to the camera body 106 at the position with a screw 109 that is put through a screw hole part 100a of the range finder unit 100 and then fitted into a screw hole 109b on the camera body 106.

By the way, electronic circuits for controlling, for example, the shutter of the camera or film wind, a one-chip microcomputer 103 that is a control circuit, and the like are mounted on a printed-circuit board 102 formed with a flexible printed-circuit board and located in the camera body 106.

A connector part 108 is formed on one edge of the printed-circuit board 102. When the range finder unit 100 is fixed to the camera body 106, the connector part 19Ba of the printed-circuit board 19B extending from the bottom of the range finder unit 100 comes into contact with the connector part 108 of the printed-circuit board 102 in the camera body 106. Thus, electrical connection between the range finder unit 100 and camera body 106 is attained. Consequently, electrical signals or the like can be communicated between the range finder unit 100 and camera body 106.

In other words, the range finder unit 100 is fixed to the top of the camera body 106 by fitting the screws 109 and 101 into the screw holes 109b and 109c bored on the top of the camera body 106. At this time, the connector part 19Ba of the printed-circuit board 19B and the connector part 108 of the printed-circuit board 102 are clamped by the screw 101, and then pressed against each other with the screwing force of the screw 101.

Since the range finder unit 100 is turned for position adjustment, the proximal part of the printed-circuit board 19B or the connector part 19Ba must be bent flexibly and shaped to be thinner.

In the range finder of the third embodiment, adjusting the positions of the light projection lens 16B and second reflecting mirror 23A in the range finder unit will be described in conjunction with FIGS. 10 and 11. In FIG. 11, for avoiding crowding the drawing, the printed-circuit board 19B is omitted.

Figure 10:
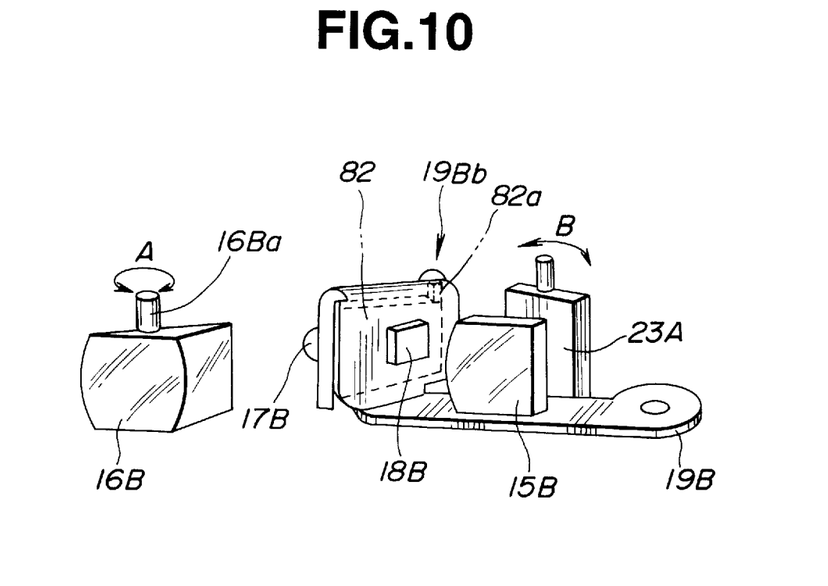
FIG. 10 is a schematic oblique view showing some of the component members arranged in a range finder unit shown in FIG. 7.
Figure 11:
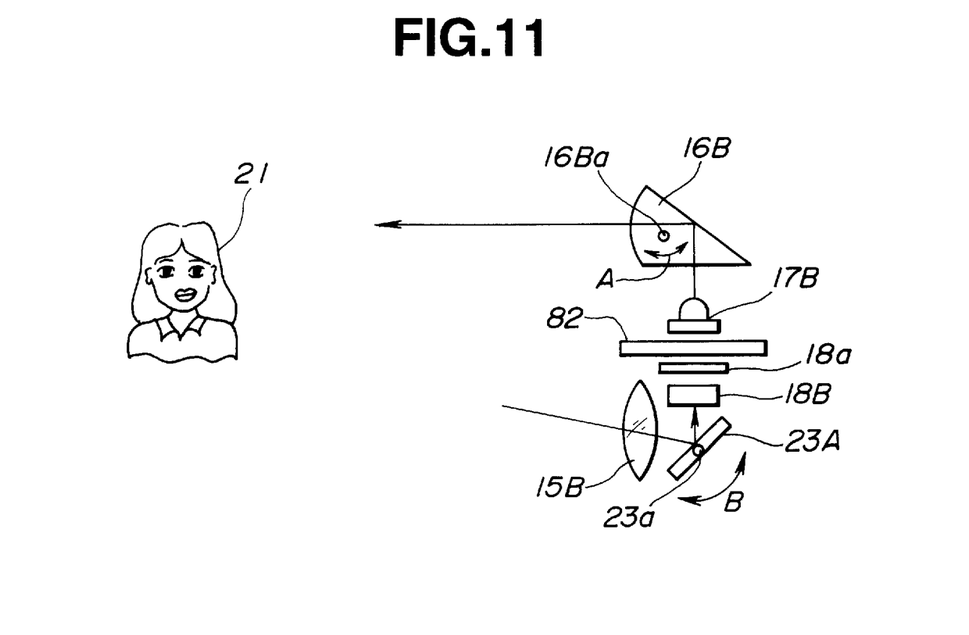
FIG. 11 is a top view of the component members shown in FIG. 10.

As shown in FIG. 10, the printed-circuit board 19B in the range finder is, as mentioned above, bent and stowed in the range finder unit 100. At this time, the IC 18a mounted on the printed-circuit board 19B is folded in (not shown in FIG. 10). The light-emitting device 17B is located at a position opposite to the position of the light-receiving device 18B so that the light-emitting direction and light-receiving direction become opposite to each other. The ground pattern 19Bb of the printed-circuit board 19B is joined with the projection 82a of the shielding plate 32, which is clamped by the printed-circuit board 19B, by performing soldering or the like. The printed-circuit board 19B is thus grounded.

As shown in FIGS. 10 and 11, the light projection lens 16B can be turned in directions of arrows A within the range finder unit 100. A focus operation can therefore be performed on a range-finding beam projected by the light projection lens 16B. Moreover, the second reflecting mirror 23A can be turned in directions of arrows B within the range finder unit 100. The position of the second reflecting mirror can therefore be adjusted so that a beam of signal light reflected from the object 21 present at a given distance and converged by the light reception lens 15B falls on a given position of the light-receiving device 18.

This kind of adjustment mechanism is necessary because when the position of each component member is deviated from a given mounting position, a range-finding beam emanating from the light-emitting device 17B is defocused, a predictable range that is an object of range finding cannot be covered, and eventually the precision of the range finder cannot be retained at a design level.

Next, an adjustment system for automatically adjusting a range finder of the third embodiment in the course of manufacturing will be described below in conjunction with a block configuration diagram of FIG. 12.

Figure 12:
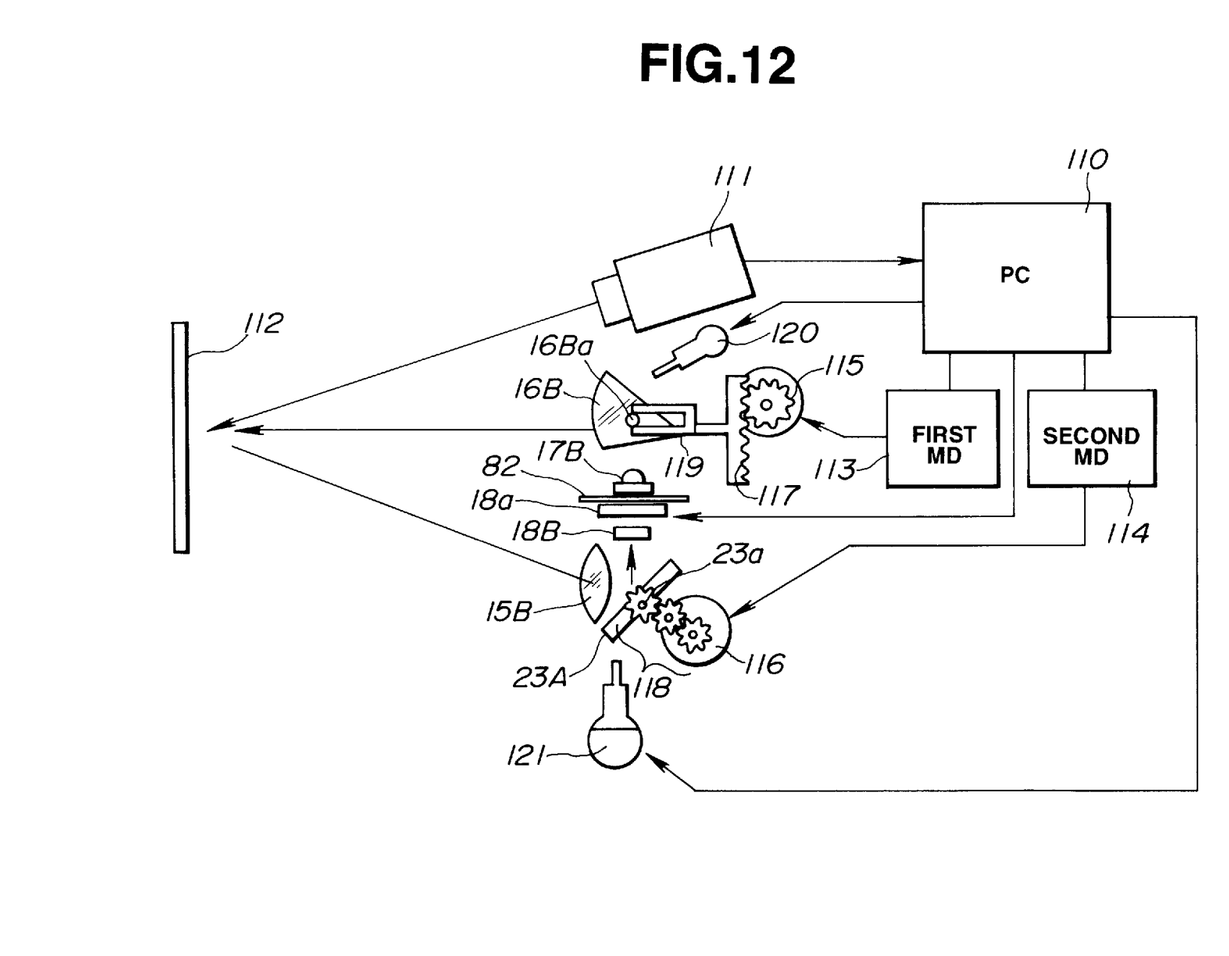
FIG. 12 is a block configuration diagram showing an adjustment system for automatically adjusting the range finder shown in FIG. 7 in the course of manufacturing.

As shown in FIG. 12, in an adjustment system for adjusting a range finder of the third embodiment, a TV camera 111 for picking up image data or the like from an adjustment chart 112, a first motor driver (MD) 113 for adjusting the light projection lens 16B in the range finder, a second motor driver (MD) 114 for adjusting the second reflecting mirror 23A on the side of light reception in the range finder, a first adhesive applying means 120 for fixing the light projection lens 16B, a second adhesive applying means 121 for fixing the second reflecting mirror 23A on the side of light reception, and the range finder of the third embodiment to be adjusted are connected to a personal computer (PC) 110 for controlling an overall sequence. The personal computer 110 controls these components.

In this case, connection of the range finder to the PC 110 is achieved through the connector part 19Ba formed on the printed-circuit board 19B in the range finder.

The first MD 113 drives and controls the motor 115, so that the adjustment lever part 16Ba of the light projection lens 16B in the range finder is turned by means of a gear array 117 and an adjustment arm 119 for adjustment of the light projection lens 16B. The second MD 114 drives and controls the motor 116, so that the adjustment lever part 23a of the second reflecting mirror 23A on the side of light reception is turned by means of a gear array 118 for adjustment of the second reflecting mirror.

The first and second adhesive applying means 120 and 121 fix the light projection lens 16B and second reflecting mirror 23A.

The adjustment chart 112 is located at a position separated by a given distance from the range finder to be automatically adjusted, and is an object separated by a given distance from the range finder and used to check projection of a range-finding beam by the light-emitting device 17B.

An automatic adjustment operation performed by the adjustment system having the foregoing components will be described in conjunction with the flowchart of FIG. 13.

Figure 13:
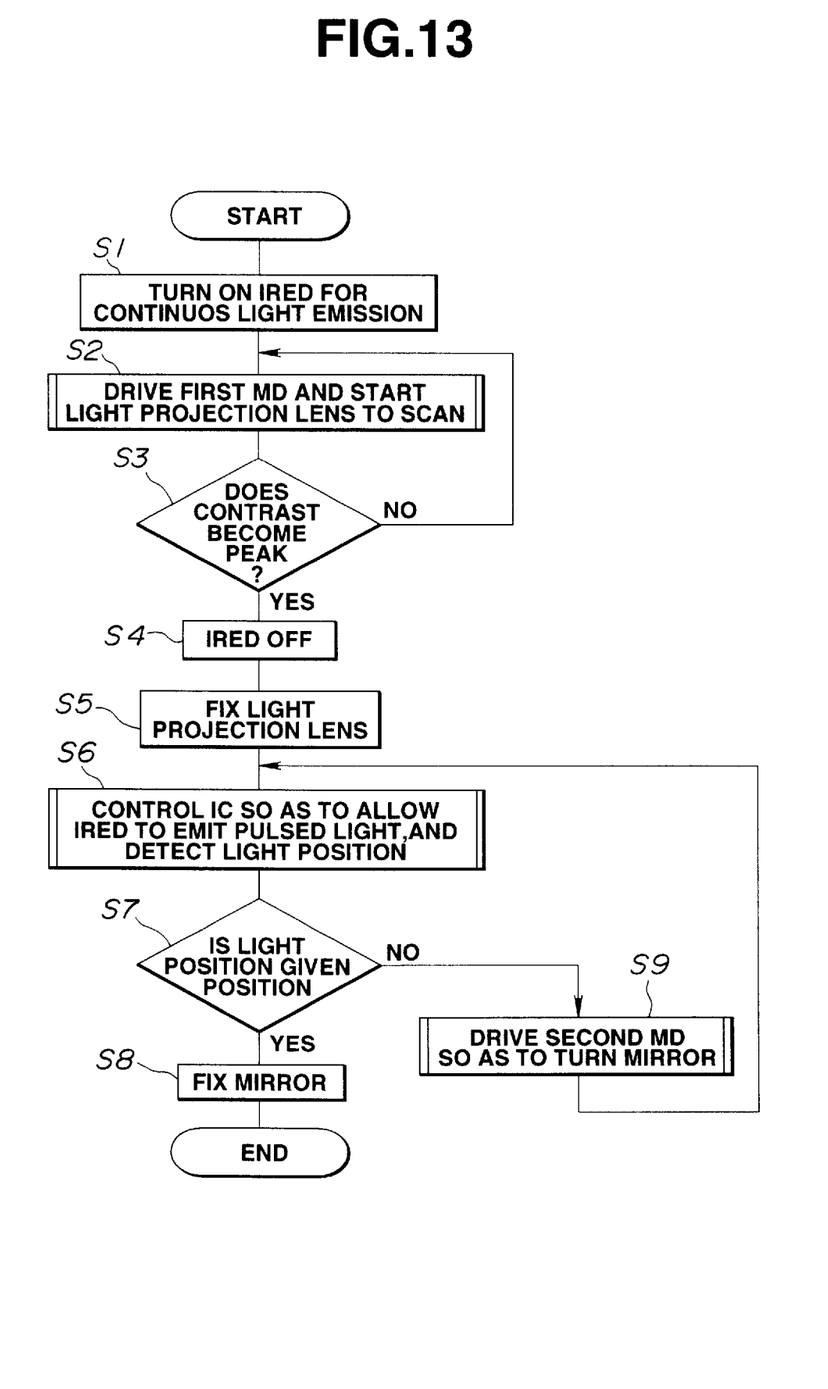
FIG. 13 is a flowchart showing an automatic adjustment operation performed by the adjustment system shown in FIG. 12.

As described in FIG. 13, first, at step S1, the PC 110 controls the IC 18a on the printed-circuit board 19B in the range finder and thus allows the light-emitting device 17B to emit light continually (turns ON the light-emitting device). At step S2, the first MD 113 is controlled and allowed to drive the motor 115. The light projection lens 17B is then started to scan. At step S3, the TV camera 111 is used to monitor the contrast of a range-finding beam emanating from the light-emitting device 17B and being directed toward the adjustment chart 112. The PC 110 then controls drive of the motor 115 so as to perform a focus operation on the light projection lens 16B. When a peak contrast, that is, a given in-focus state is detected, the PC 110 terminates projection of a range-finding beam by the light-emitting device (IRED) 17B (turns OFF the light-emitting device) as processing of step S4, and controls the first adhesive applying means 120 so that the light projection lens 16 is fixed with an adhesive.

Herein, since ordinary light other than reflected signal light reflected from the object 21 falls on the light-receiving device 18B, the light-emitting device 17B is driven with pulses sent from the IC 18a during a range-finding operation in order to distinguish the ordinary light from the reflected signal light reflected from the object 21.

In other words, at step S6, the PC 110 controls the IC 18a to allow the light-emitting device (IRED) 17B to emit pulsed light. This causes an operation for detecting an incident position, at which reflected signal light reflected from the object 21 falls on the light-receiving device 18B, to start. With the processing of step S7, it is detected if a detected beam of reflected signal light has fallen on a given position. If the detected beam of reflected signal light has not fallen on the given position, control is passed to the processing of step S9. At step S9, the PC 110 controls the second MD 114 so that the motor 116 is driven. This causes the second reflecting mirror 23A to turn. The processing of step S6 and thereafter is then repeated.

With the processing of step S7, if it is detected that the detected beam of reflected signal light has fallen on the given position, control is passed to the processing of step S8. With the processing of step S8, the second adhesive applying means 121 is controlled in order to fix the second reflecting mirror 23A with an adhesive. Thus, a sequence is terminated (end).

The range finder unit 100 that has been automatically adjusted and manufactured as mentioned above is mounted in a camera as described in conjunction with FIG. 8. At this time, as described previously, the position of the range finder unit 100 is adjusted by turning the entire range finder unit so that a range-finding beam will be projected within the range-finding target mark 131 inside the viewfinder picture frame 130 (See FIG. 9).

As described above, even the third embodiment can provide the same advantage as the aforesaid first embodiment.

Next, a range finder of the fourth embodiment of the present invention will be described below. In the third embodiment, a light-projecting position for a range-finding beam emanating from a light-emitting device is adjusted by turning the entire range finder unit. In the fourth embodiment, the light-projecting position is adjusted by handling the light-emitting device alone. In this point alone, the fourth embodiment is different from the third embodiment. The description of members identical to those in the third embodiment will therefore be omitted. Only the different members will be described below.

Figure 14:
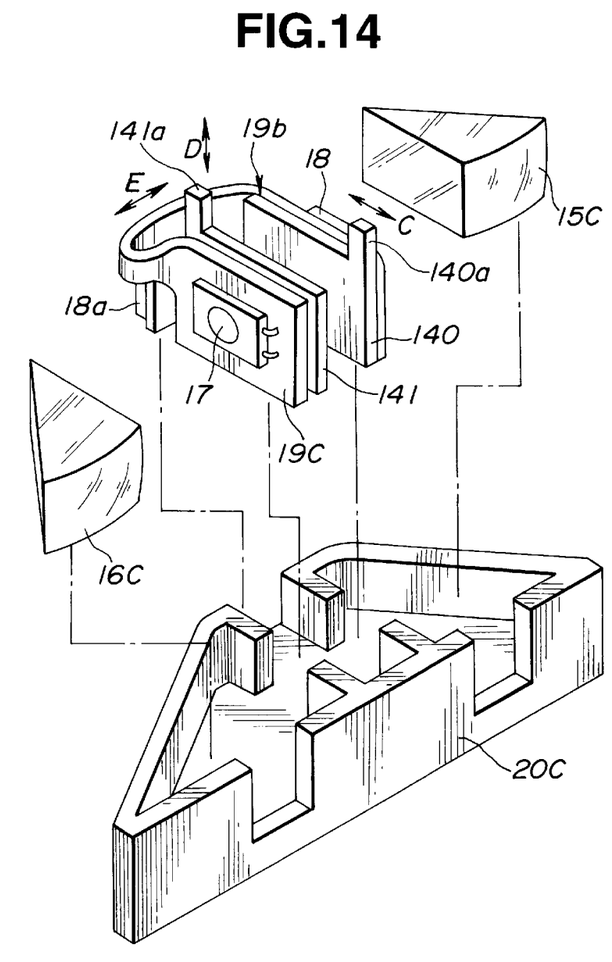
FIG. 14 is an exploded oblique view roughly showing the structure of a range finder of a fourth embodiment of the present invention.
Figure 15:
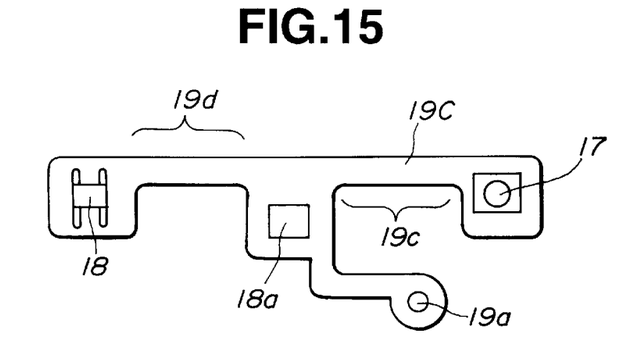
FIG. 15 is a developed state of a flexible printed-circuit board employed in the range finder shown in FIG. 14.

As shown in FIG. 14, a light-emitting device 17 and light-receiving device 18, an IC 18a, and the like are mounted on a flexible printed-circuit board 19C adopted for use in to the range finder of the fourth embodiment. The flexible printed-circuit board 19C has a connector part 19a. In this case, the printed-circuit board 19C has elongated line connection parts 19c and 19d defined between the devices 17 and 18 and the IC 18a, and is thus shaped to facilitate relative movements of both the devices 17 and 18.

The printed-circuit board 19C is bent as shown in FIG. 14, and thus stowed in a main unit 20C of the range finder. At this time, the light-emitting device 17 and light-receiving device 18 mounted on the printed-circuit board 19C are opposed to each other and arranged so that the light-emitting direction and light-receiving direction become opposite to each other. Rigid members 140 and 141 formed with, for example, shielding plates are placed as reinforcement members between the devices 17 and 18. A ground pattern part 19b of the printed-circuit board 19C is joined with the rigid member 140 by soldering or the like, whereby the printed-circuit board 19C is grounded.

The rigid members 140 and 141 have adjustment lever parts 140a and 141a jutted upward. The rigid members 140 and 141 are affixed to the backs of the devices 17 and 18 on the printed-circuit board 19C by means of, for example, double-sided adhesive tape. By moving the adjustment lever parts 140a and 141a in directions of arrows C, D, and E in FIG. 14, the light-projecting direction for the light-emitting device 17 and the incident position of reflected light relative to the light-receiving device 18 can be adjusted.

By the way, a light projection lens 16C formed with a prism or the like is placed on one edge of the main unit 20C of the range finder, and a light reception lens 15C formed with a prism or the like is placed on the other edge thereof.

As described above, even the fourth embodiment provides the same advantage as the aforesaid first embodiment. Since a light-projecting position and light-receiving position can be adjusted by moving the adjustment lever parts 140a and 141a of the rigid members 140 and 141 affixed to the printed-circuit board 19C on which the light-emitting device 17 and light-receiving device 18 are mounted, a delicate operation such as angle adjustment need not be carried out. Moreover, the position of the range finder can be adjusted readily without the necessity of moving a large optical part or the like. This contributes to realization of a compact design for the range finder itself.

The adjustment mechanisms described in the third and fourth embodiments may be excluded depending on an object of use of a range finder. That is to say, for adjusting an incident position of reflected light, the light-receiving side of a light-receiving device is designed to be larger so that reflected signal light falls on the light-receiving device without fail, and electrical correction is carried out. This makes it possible to exclude the adjustment mechanism for the light-receiving device.

In this case, the IC 18a or the like is provided with, for example, a writable memory. Information such as deviations of positions of component members from given mounting positions, which occur during assembling, is recorded in the memory. Control is given so that every time a range-finding operation is carried out, the information recorded in the memory is referenced for correction.

Moreover, when so-called piercing parts like those adapted to the light-emitting device 17A and light-receiving device 18A in the range finder of the second embodiment are employed, an assembling process in which the lengths of the bents of the leads of the devices 17A and 18B are optimized may be substituted for adjustment of a range finder unit.

In the third embodiment, an adjustment mechanism is a mechanism for moving the light projection lens 16B and the second reflecting mirror 23A on the side of light reception. In the fourth embodiment, an adjustment mechanism is a mechanism for moving the printed-circuit board 19C. The present invention is not limited to these modes. Alternatively, for example, members or the like constituting an optical system may be moved for adjustment on the side of light reception, and a printed-circuit board or the like on which a light-emitting device is mounted may be moved for adjustment on the side of light projection. Even in this alternative, adjustment can be achieved in the same manner as the aforesaid one.

Next, a range finder of the fifth embodiment of the present invention will be described in conjunction with FIGS. 16, 17, and 18. The range finder of the fifth embodiment has fundamentally the same components as any of the aforesaid embodiments, though a simpler mechanism is used as an adjustment mechanism for the light projection and reception lenses.

Figure 16:
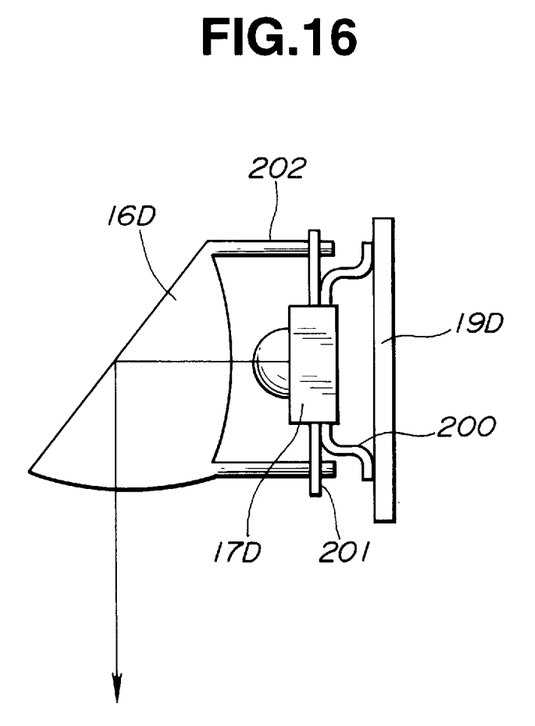
FIG. 16 is a side view showing part of a range finder of a fifth embodiment of the present invention.
Figure 17:
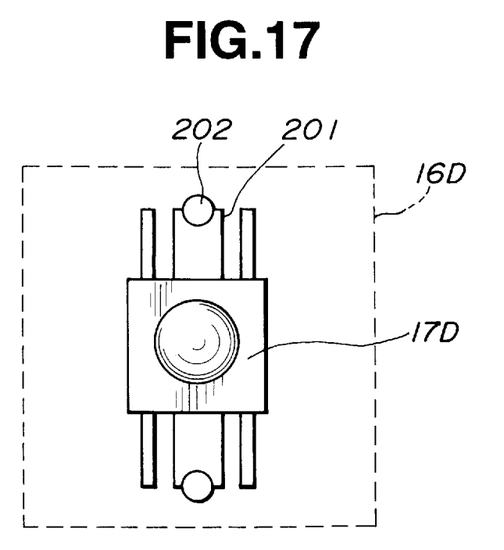
FIG. 17 is a top view of FIG. 16.

As shown in FIGS. 16 and 17, a light projection lens 16D formed with, for example, a prism, has projections 202 serving as positioning means formed at positions opposed to a light-emitting device 17D mounted on a printed-circuit board 19D. Some of a plurality of leads of a lead frame 200 for the light-emitting device 17 are used as positioning parts 201. The positioning parts 201 that are leads for use in positioning are engaged with engagement sections of the projections 202 of the light projection lens 16D, whereby the light projection lens 16D is positioned. Thus, a light-projecting direction or a light-receiving position is adjusted.

The foregoing fifth embodiment (shown in FIGS. 16 and 17) is concerned with only the side of light projection composed of a light projection lens, light-emitting device, and the like. The same structure can be adopted to the side of light reception composed of a light reception lens, light-receiving device, and the like.

In general, for mounting a semiconductor chip of a light-emitting device formed with an infrared light-emitting diode (IRED) or a light-receiving device formed with a light position detecting device (PSD) on a printed-circuit board, the chip is positioned relative to a lead frame (leads). The printed-circuit board is then provided as a product. An error of the position of the semiconductor chip with respect to the lead frame is therefore limited. Once the spacing between the semiconductor chip of a light-emitting device or light-receiving device and a light projection lens or light reception lens is determined correctly, a light-projecting direction or a light-receiving position will be set correctly.

Figure 18:
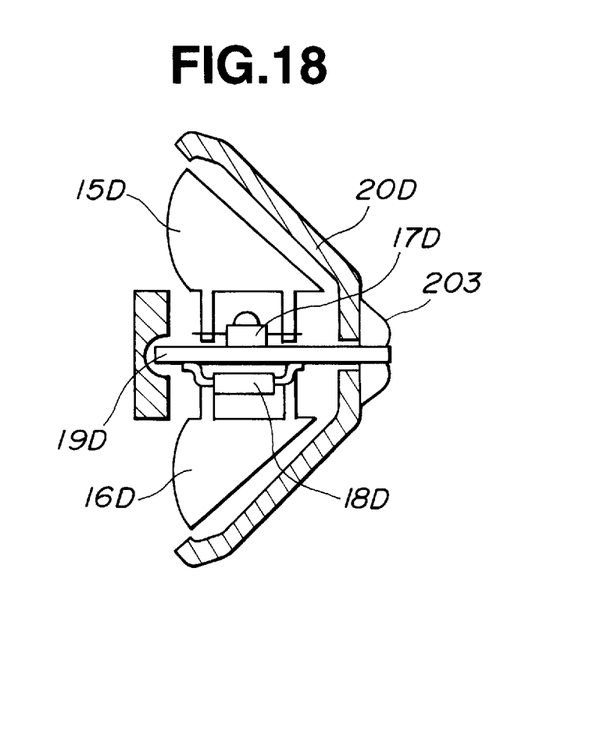
FIG. 18 roughly shows the entire range finder shown in FIG. 16 in sectional fashion.

From this viewpoint, after the light projection lens 16D (or light reception lens 15D) is, as shown in FIGS. 16 and 17, attached to the lead frame for the light-emitting device 17D mounted on the printed-circuit board 19D, the assembly is, as shown in FIG. 18, incorporated in a main unit 20D of the range finder. The printed-circuit board 19D is then reinforced using an adhesive 203 or the like. Consequently, a manufacturing error of the light projection lens 16D or light reception lens 15D relative to the main unit 20D and a manufacturing error of the main unit 20D relative to the printed-circuit board 19D will not be integrated but light paths for light projection and light reception close to designed paths can be ensured.

As described above, according to the fifth embodiment, the process of adjusting the relative positions of the light-emitting device 17D and light-receiving device 18D or the light projection lens 16D and light reception lens 15D can be simplified. This eventually contributes to minimization of manufacturing cost.

In the present invention, it will be apparent that a wide range of different working modes can be formed on the basis of this invention without a departure from the spirit and scope of the invention. This invention will not be restricted to any specific embodiment except as may be limited to the appended claims.

What is claimed is:

1. A range finder having a light-emitting device and light-receiving device, comprising:

a flexible printed-circuit board on which electrical parts including said devices are mounted; and a reinforcement member capable of reinforcing and supporting said flexible printed-circuit board and intercepting light emanating from said light-emitting device, wherein said flexible printed-circuit board is bent along said reinforcement member.

2. A range finder according to claim 1, wherein said reinforcement member is a conductive member and serves also as a shield for a signal line extending from said light-receiving device.

3. A range finder having a light-emitting device and light-receiving device, comprising:

a plate-like reinforcement member;

a flexible printed-circuit board to which said light-emitting device and light-receiving device are connected, and which is bent so that board portions are arranged along opposite sides of said reinforcement member so that said light-emitting device and said light-receiving device are located at substantially the same position with said reinforcement member between them;

a light projection lens and light reception lens respectively associated with said light-emitting device and light-receiving device;

a first reflective optical member lying between said light-emitting device and light projection lens and leading light emanating from said light-emitting device toward said light projection lens; and a second reflective optical member lying between said light-receiving device and light reception lens and leading light incident on said light reception lens toward said light-receiving device.

4. A range finder, comprising:

a light-projecting device for projecting light to an object;

a light-receiving device for receiving light emitted from said light-projecting device and reflected from said object; and a single planar electric printed-circuit board for which mounting or incorporation is completed and which has said light-projecting device mounted on one side thereof and said light-receiving device mounted on the other side thereof, said mounted sides of said light-projecting device and light-receiving device being substantially opposed to each other.

5. A range finder according to claim 4, wherein: the position of at least one of said light-receiving device and light-projecting device can be adjusted; said electric printed-circuit board is a flexible printed-circuit board; and electrical line connection parts of said printed-circuit board interposed between said light-receiving device and light-projecting device are elongated in order to facilitate relative movements of said light-receiving device and light-projecting device to be made at the time of adjustment of the positions thereof.

6. A range finder according to claim 4, wherein said light-projecting device and light-receiving device are mounted on said printed-circuit board so that they are substantially opposed to each other.

7. A range finder according to claim 4 further comprising a light-projecting optical system for projecting light emanating from said light-projecting device to an object, and a light-receiving optical system for leading reflected light to said light-receiving device.

8. A range finder according to claim 7, wherein said light-projecting optical system and light-receiving optical system provide optical paths along which light is bent substantially perpendicularly.

9. A range finder, comprising:

a flexible printed-circuit board having a range-finding light-receiving device, a range-finding circuit, and a light-projecting device for projecting range-finding light mounted on the same side thereof; and light interceptive members along which said flexible printed-circuit board is bent, wherein said light interceptive members have an electric shielding characteristic.

10. A range finder according to claim 9, wherein said range finder is mounted in a camera body so that the position thereof can be adjusted.

11. A range finder, comprising:

a light-projecting device for projecting range-finding light to an object;

a light-receiving device for receiving range-finding light reflected from said object and based on said range-finding light from said light-projecting device;

a light projection lens and light reception lens respectively associated with said light-projecting device and light-receiving device;

a first reflective optical member lying between said light-projecting device and light projection lens, and leading light projected from said light-projecting device toward said light projection lens;

a second reflective optical member lying between said light-receiving device and light reception lens, and leading light incident on said light reception lens toward said light-receiving device; and an adjustment means for adjusting a position of at least one of said first reflective optical member and second reflective optical member so that range-finding light emanating from said light-projecting device can be projected to a given position or said reflected signal light can be received at a correct positions; and said light projection lens and said first reflective optical element being integrated into a single unit, said single unit being movable relative to said light receiving device and said second reflective optical member.

12. A range finder, comprising:

a light-projecting device for projecting light to an object;

a light-receiving device for receiving light emitted from said light-projecting device and reflected from said object; and a single, planar electric printed-circuit board for which mounting or incorporation is completed, said light-projecting device and said light-receiving device being electrically coupled to said printed-circuit board, at least a portion of said printed-circuit board being arranged at an intermediate position along a linear path extending between said light-projecting device and said light-receiving device, said portion blocking light emitted by said light-projecting device and directed along said linear path from reaching said light receiving device.

13. A range finder according to claim 11 wherein said light projecting and light receiving elements are arranged back to back on opposite sides of a barrier arranged therebetween.

14. A range finder according to claim 11 wherein said light projecting and light receiving elements are arranged on a first surface of a flexible printed circuit;

said flexible printed circuit being folded over a barrier member so that a surface of said flexible printed circuit opposite said first surface engages said barrier member; and said light projecting and receiving elements face opposing directions.

15. A range finder according to claim 13 further comprising:

a housing enclosing said light projecting and receiving elements and said first and second reflective optical members; and said adjustment means comprising a pin extending from said housing for performing an adjustment of the barrier external to said housing.

16. A range finder according to claim 15 further comprising a second pin for adjustably mounting said housing on a body having an optical taking lens to align the range finder with the taking lens.

17. A range finder according to claim 4 further comprising first and second reflective members for respectively reflecting light from said light projecting device toward a subject and for reflecting light from the subject toward said light receiving device.

18. A range finder according to claim 17 further comprising a housing for enclosing and supporting said first and second reflective elements, said board and said light emitting and light receiving devices.

19. A range finder according to claim 4 wherein said board is a flexible board bent around a barrier member.

20. A range finder according to claim 18 wherein said board is a flexible board bent around a barrier member.

21. A range finder according to claim 20 further comprising a pin on said barrier member projecting from said housing to enable adjustment of the barrier member from operation of said pin external to said housing.

22. A range finder according to claim 19 wherein said reflective members are each respectively incorporated as an integral member of an optical element for focusing light rays.

23. A range finder according to claim 4 further comprising:

first and second barrier members;

said board being a flexible printed circuit, portions thereof respectively supporting said light projecting and light receiving elements resting against said first and second barrier members.

24. A range finder according to claim 23 wherein said first and second barrier members are swingably mounted in said housing for adjusting said light projecting and receiving devices.

* * * * *

UNITED STATES PATENT AND TRADEMARK OFFICE
CERTIFICATE OF CORRECTION

PATENT NO. : 5,812,893
DATED : September 22, 1998
INVENTOR(S) : Hikita et al.

It is certified that error appears in the above-identified patent and that said Letters Patent is hereby corrected as shown below:

Column 1, line 52, before "finder" insert --range--.

Column 11, line 3, delete "adopted" and insert instead --adapted--.

Column 11, line 4, delete "to".

Signed and Sealed this

Twenty-eighth Day of March, 2000

Attest:

Q. TODD DICKINSON

*Attesting Officer*  *Commissioner of Patents and Trademarks*